United States Patent

Takemoto et al.

[11] Patent Number: 5,873,011
[45] Date of Patent: *Feb. 16, 1999

[54] IMAGE FORMING APPARATUS

[75] Inventors: Shinichi Takemoto; Yasuyuki Inada, both of Toyokawa, Japan

[73] Assignee: Minolta Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 815,766

[22] Filed: Mar. 12, 1997

[30] Foreign Application Priority Data

| Mar. 13, 1996 | [JP] | Japan | 8-056449 |
| Mar. 13, 1996 | [JP] | Japan | 8-056451 |
| Mar. 13, 1996 | [JP] | Japan | 8-056453 |

[51] Int. Cl.$^6$ .................................................. G03G 15/00
[52] U.S. Cl. .................................. 399/49; 399/55; 399/72
[58] Field of Search .................................. 399/49–51, 55, 399/72, 46, 38; 358/296, 298, 300

[56] References Cited

U.S. PATENT DOCUMENTS

| 4,505,572 | 3/1985 | Ashida et al. . | |
| 4,796,065 | 1/1989 | Kanabayashi . | |
| 5,107,302 | 4/1992 | Bisaiji . | |
| 5,124,750 | 6/1992 | Naito | 399/55 |
| 5,250,988 | 10/1993 | Matsuura et al. | 399/42 |
| 5,315,351 | 5/1994 | Matsushiro et al. | 399/49 |
| 5,315,352 | 5/1994 | Nakane et al. | 399/49 |
| 5,365,313 | 11/1994 | Nagamochi et al. | 399/49 |
| 5,579,090 | 11/1996 | Sasanuma et al. | 399/49 |
| 5,583,644 | 12/1996 | Sasanuma et al. | 358/296 |
| 5,734,948 | 3/1998 | Nagayama et al. | 399/46 |
| 5,774,762 | 6/1998 | Takemoto et al. | 399/55 X |

FOREIGN PATENT DOCUMENTS 08-211722  8/1996  Japan .

*Primary Examiner*—Matthew S. Smith
*Attorney, Agent, or Firm*—McDermott, Will & Emery

[57] ABSTRACT

In an electrophotographic image forming apparatus, in order to control image forming conditions, first and second toner images are formed. The first standard toner image has toners of a uniform density, and the second standard toner image has a plurality of dots made of toners with predetermined spaces between them. A light scattered from the first standard toner image and a light normally reflected from the second standard toner image are detected, and image forming conditions are controlled according to the detected lights before an image is formed according to image data. Further, in an image forming apparatus where area gradation is used for forming an image, a plurality of second standard toner images having different area ratios is formed, and gradation can be changed by controlling the image forming conditions according to the lights reflected from the standard toner images.

26 Claims, 15 Drawing Sheets

92

91

IMAGE FORMING APPARATUS

BACKGROUND OF THE INVENTION

1. Field of the Invention

The present invention relates to an electrophotographic image forming apparatus such as a printer or a copying machine.

2. Description of Prior Art

Area gradation method is used for many image forming apparatuses for expressing gradation with coarse or dense distribution of dots or lines. Many images formed by such an image forming apparatus such as a copying machine has various sections including a uniform density areas or half-tone density areas therein. Therefore, it is required to form an image with reproducible colors and densities. After an electrostatic latent image is formed on a photoconductor, toners are adhered onto the latent image to form a toner image. However, as the amount of charges on toners are changed with humidity or temperature, the extension (two-dimensional change in lateral directions) or the thickness (three-dimensional change in height direction) of toners adhered to an electrostatic latent image are changed. Then, it is desirable to stabilize an image by detecting the change in extension and height of toners adhered onto the photoconductor precisely to control the image forming conditions such as development bias voltage.

If the output of the sensor used for the image stabilization scatters, changes in extension and in height of toners adhered onto the photoconductor cannot be detected sufficiently precisely in order to control the image forming conditions. Therefore, it is desirable to increase the accuracy of the sensor output.

Further, in an image forming apparatus using area gradation method, when gradation characteristic is changed, the dot size of the dots or lines formed on the photoconductor and the amount of toners adhered to a unit area have also to be controlled. However, if the development bias voltage is shifted in order to change the amount of adhered toners, the dot size is also changed. Further, if the surface potential of the photoconductor is shifted in order to change the dot size, the transfer efficiency is also changed. Then, the image forming becomes unstable when gradation characteristic is changed. Then, it is desirable to control the image forming conditions so as to stabilize image formed with desired gradation characteristics.

SUMMARY OF THE INVENTION

An object of the present invention is to provide an image forming apparatus which can produce an image stably.

In one aspect of the invention, in order to control image forming conditions before an image is formed according to image data, a first standard toner image and a second standard toner image are formed on a photoconductor. The first standard toner image has toners of a uniform density, and the second standard toner image has a plurality of dots made of toners with predetermined spaces between them. Then, a light scattered from the first standard toner image and a light normally reflected from the second standard toner image are detected, and image forming conditions such as surface potential of the photoconductor or a development bias voltage of a development device are controlled according to the detected lights.

In a second aspect of the invention, in order to control image forming conditions before an image is formed according to image data, first and second standard toner images are formed on a photoconductor. The two standard toner images have a plurality of dots made of toners with predetermined spaces between them, but they are formed with light intensities different from each other. For example, the first standard toner image is formed with a predetermined light intensity, while the other is formed with a light intensity different from the predetermined light intensity. Then, a comparator compares the ratios of lights normally reflected from the two standard toner images, and image forming conditions are controlled so that the ratios detected are the same each other.

In a third aspect of the invention, in order to increase the accuracy of the output of a sensor for detecting the density thereof, a relative speed of the photoconductor to the development device is delayed for forming a toner image for adjusting the light intensity of a light source whereby a toner image of a high density is formed. Then, an intensity of a light reflected form the toner image is detected, and the light intensity of the light source is adjusted so that the detected intensity has a predetermined, saturation value. Then, the accuracy of the sensor is improved, and the above-mentioned image stabilization process using the sensor can be performed precisely.

An advantage of the invention is that image forming conditions can be controlled for image stabilization according to the scattered light and the normally reflected light from two standard toner images.

Another advantage of the invention is that image forming conditions can be controlled so that an image having the gradation desired by an operator can be output.

A further advantage of the invention is that the precision of density detection on a toner image is increased.

BRIEF DESCRIPTION OF THE DRAWINGS

These and other objects and features of the present invention will become clear from the following description taken in conjunction with the preferred embodiments thereof with reference to the accompanying drawings, and in which:

FIGS. 7A and 8B are diagrams for explaining a change of the intensity of scattered light according to the thickness of toners;

DETAILED DESCRIPTION OF THE PREFERRED EMBODIMENTS

Figure 1:
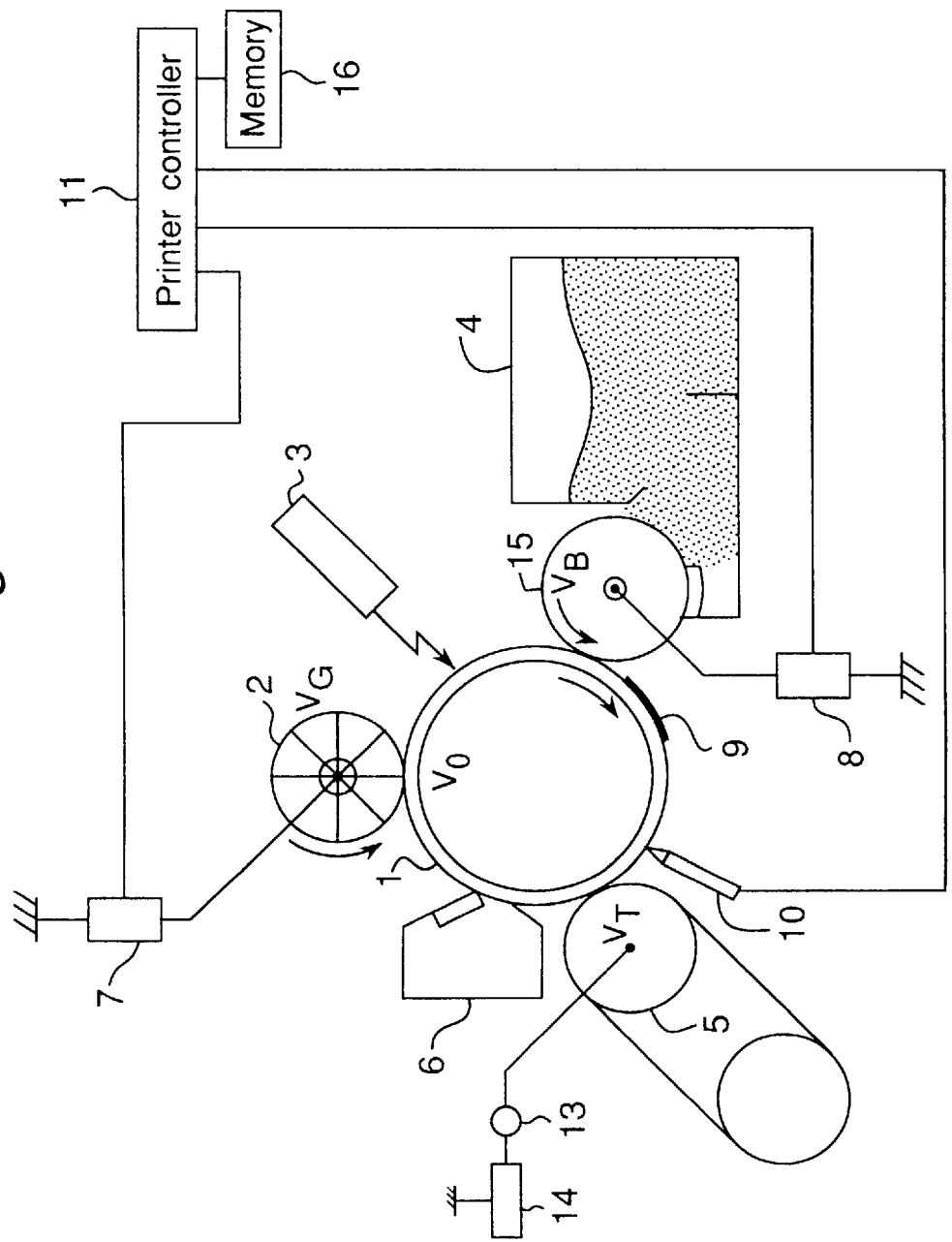
FIG. 1 is a schematic sectional view of an electrophotographic copying machine of an embodiment of the invention.

Referring now to the drawings, wherein like reference characters designate like or corresponding parts throughout the views, FIG. 1 shows an electrophotographic copying machine of a first embodiment of the invention. The copying machine uses an area gradation method for expressing gradation with coarse or dense distribution of dots or lines. A photoconductor drum 1 having an organic photoconductor on its surface for forming an electrostatic latent image is rotatable clockwise as shown with an arrow in FIG. 1. A charging brush 2, a laser exposure unit 3, a development device 4 having a development sleeve 15, an image sensor 10, an intermediate transfer unit 5 having a belt and a cleaner unit 6 are provided around the photoconductor drum 1 successively. The surface of the photoconductor drum 1 is charged uniformly with the charging brush 2 to which a high voltage is applied by a power source 7. Then the laser exposure unit 3 modulates a laser beam according to image data to form an electrostatic latent image on the surface of the photoconductor drum 1. The development device 4 comprises four development units for colors of cyan, magenta, yellow and black though only one unit is shown in FIG. 1 for the ease of the explanation. A bias voltage $V_B$ is applied to the sleeve 15 by a power source 8. A printer controller 11 including a central processing unit selects a development unit for cyan first, and the development unit develops the latent image with cyan toners to form a toner image 9. The intermediate transfer unit 5 has a belt made of an electrically conducting resin. A transfer voltage $V_T$ having a polarity reverse to that of the toners is applied to the belt by a power source 14 through a current detector 13. The current detector 13 is provided to measure the resistance of the intermediate transfer material or the belt of the intermediate transfer unit 5. Then, the toner image is transferred onto the belt electrostatically by the transfer voltage $V_T$. Toners remained on the belt after the transfer is recovered by the cleaner unit 6. The above-mentioned charging, exposure, development and transfer are repeated in the order of cyan, magenta, yellow and black to overlap the toner images of the four colors on the intermediate transfer unit 5. Then, the layered toner images are transferred onto a paper (not shown) electrostatically and fixed thereon by a fixing unit (not shown). Thus, an image is formed on a paper.

In order to produce always the same image for the same image data, image forming conditions have to be controlled such as the surface potential $V_O$ of the photoconductor drum 1 or the development bias voltage $V_B$ of the development device 4. In order to control the image forming conditions, before an image is formed, a first standard dot toner image 91 and a second standard uniform density toner image 92 are formed, and the image sensor 10 detects an area ratio of the standard dot toner image 91 and an amount of adhered toners (or thickness) of the standard uniform density toner image 92. A memory 16 connected to the printer controller 11 stores a plurality of look-up tables for controlling image forming conditions, the detected value of the image sensor 10 and the setting values for the power sources 7, 8. The printer controller 11 controls the surface potential $V_O$ and the development bias voltage $V_B$ according to the detected values with reference to the look-up tables stored in the memory 16. Details of the control of image forming conditions are explained below.

Figure 2:
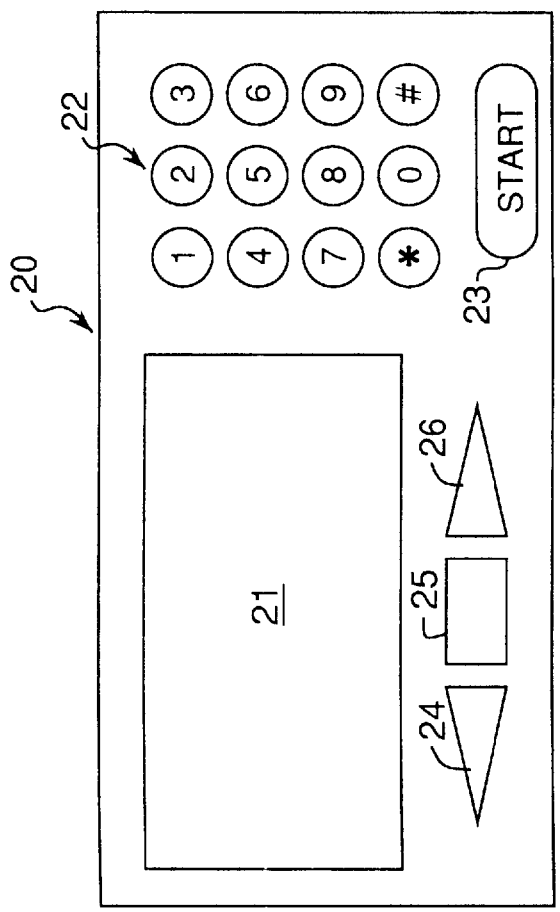
FIG. 2 is a plan view of an operational panel.

FIG. 2 shows an operational panel 20. The operational panel 20 has a display panel 21 for displaying the number of copies, copy operation status or the like, ten-keys 22, start key 23 for starting copy operation, and keys 24–26 for setting area ratios 60, 50 and 40% of reference dot images. (The keys are used in the second embodiment explained later.)

Figure 3:
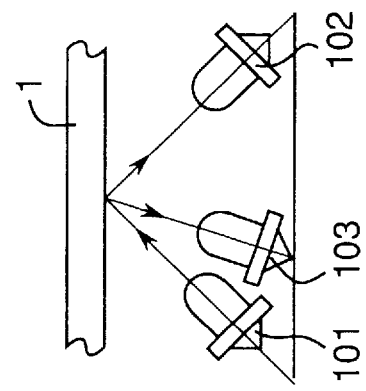
FIG. 3 is a elevational view of an image sensor.

The extension and height of toners adhered onto the photoconductor are affected by humidity, temperature or the like. In order to stabilize an image, the change in extension and height of toners are detected precisely with the sensor 10 so as to control the image forming conditions. FIG. 3 shows the image sensor 10 comprising a light emitting diode 101 to illuminate a standard toner image formed on the photoconductor drum 1 at a predetermined angle, a photosensor 102 to detect the light from the light emitting diode 101 reflected by the standard toner image at the normal reflection angle, and another photosensor 103 to detected scattered light from the standard toner image.

Figure 4:
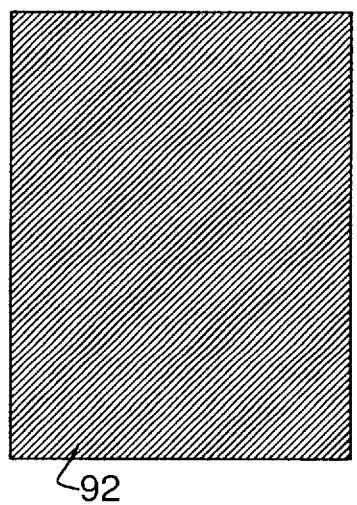
FIG. 4 is a schematic diagram of a standard uniform density toner image.
Figure 5:
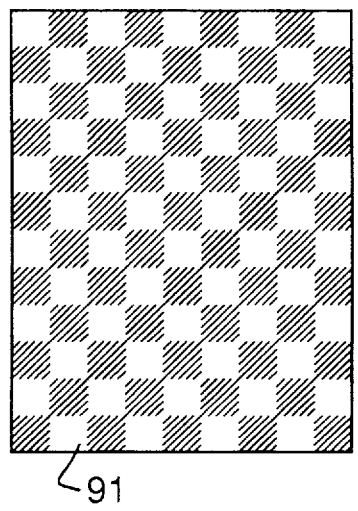
FIG. 5 is a schematic diagram of a standard dot toner image.

The printer controller 11 forms the second standard uniform density toner image 92 shown in FIG. 4 and the first standard dot toner image 91 shown in FIG. 5 in order to detect toner height and extension of toners adhered onto the photoconductor. First, in order to detect the thickness (or height) of toners adhered to the photoconductor drum 1, the second standard toner image 92 shown in FIG. 4 is formed on the photoconductor drum 1. The second standard toner image 92 is an image with a uniform density formed by always turning on the laser exposure unit 3. The photosensor 103 detects the light emitted by the light emitting diode 101 and scattered by the toners. Next, in order to detect the area ratio (or extension) of a dot image, the first standard dot toner image 91 shown in FIG. 5 is formed on the photoconductor drum 1. The first standard toner image 91 is a dot image formed by turning on and off the laser exposure unit 3 at a predetermined period. The photosensor 102 detects the light emitted by the light emitting diode 101 and reflected normally by the toners. The normal reflection means that the light is reflected at the same angle as the incident angle. As mentioned above, at a first stage, the uniform density toner image 92 is formed to detect scattered light by the photosensor 103. Thus, the amount of adhered toners of the standard toner image is determined. Next, in a second stage, the dot toner image 91 is formed to detect the normally reflected light by the photosensor 102. Thus, the area ratio of the standard dot image is detected.

Figure 6A:
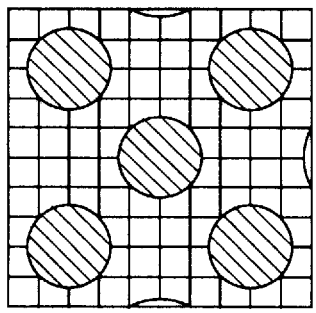
FIGS. 6A, 6B, 6C, 6D, 6E and 6F are schematic diagrams for explaining a change in intensity of reflected light for various dot sizes.
Figure 6B:
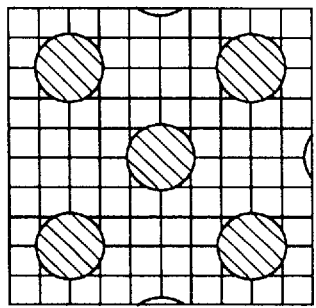
Figure 6C:
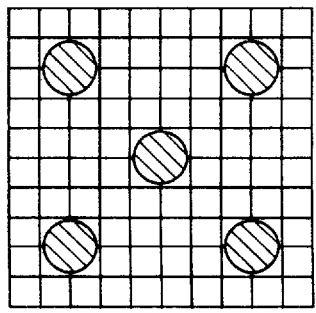
Figure 6D:
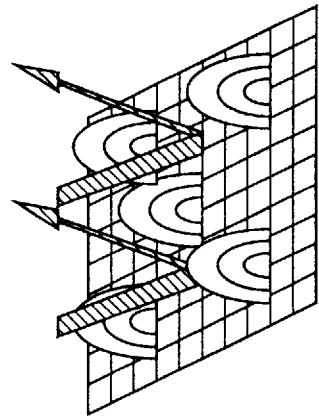
Figure 6E:
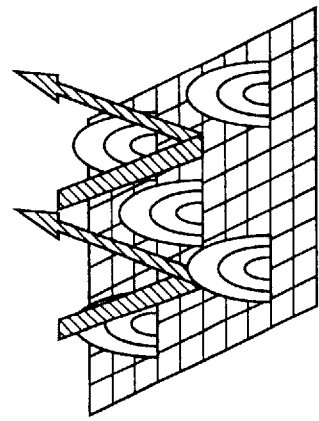
Figure 6F:
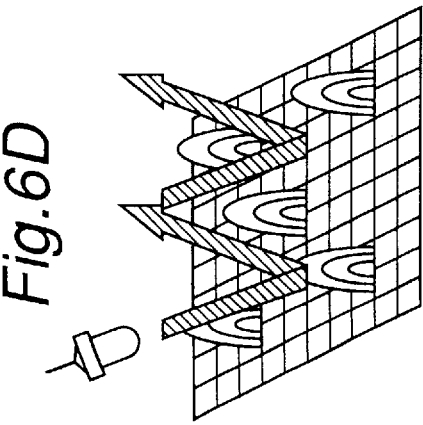

The detection of the area ratio of the standard dot image is explained further. FIGS. 6A, 6B and 6C shows dots of toners shown with circles with hatching. As the dot size increases in the order of FIGS. 6A, 6B and 6C, the intensity of normally reflected light from the dots decreases as shown in FIGS. 6D, 6E and 6F, as shown with the width of arrows for reflected lights. This is based on a fact that the incident light from the light emitting diode 101 becomes harder to be scattered on the surface of the photoconductor drum 1 having no adhered toners while most of them is reflected normally, and that most of the incident light is reflected largely by a toner image and the light along the normally reflecting direction becomes weaker. That is, most of the light detected by the photosensor 102 is a normally reflected light from the surface with no adhered toners of the standard dot toner image 91. Therefore, the area ratio of the standard dot toner image 91 is determined according to the detected value by the photosensor 102. If the detection range of the photosensor 102 is limited, the detected values scatter largely according to the position of the measured range. In order to detect the normally reflected light from many dots stably, it is preferable that the light emitting diode 101 and the photosensor 102 do not have so much directivity and that the incident angle of the light emitted by the light emitting diode 101 becomes wider against a normal of the photoconductor drum 1.

Figure 7A:
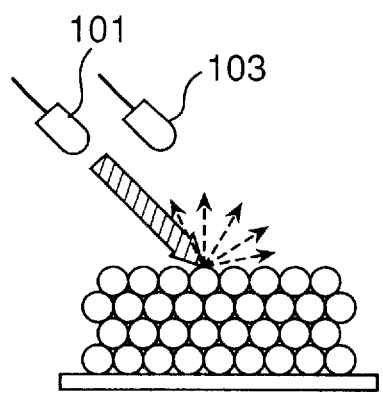
Figure 7B:
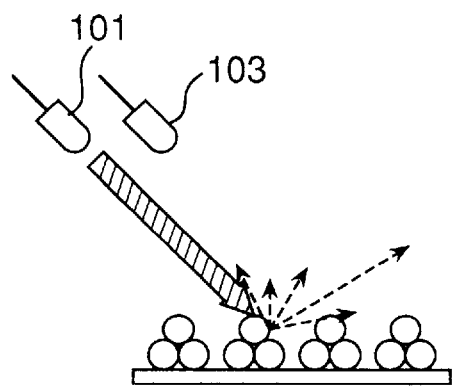

Next, the detection of the thickness of toners adhered to the photoconductor drum 1 is explained. FIGS. 7A and 7B explain a change in the intensity of scattered light according to the thickness of toners. The directions and the lengths of the arrows in FIGS. 7A and 7B represent directions and intensities of reflected lights. FIG. 7A shows that most of the light is reflected randomly and uniformly when the amount of adhered toners is large. FIG. 7B shows that most of the light is reflected along the normally reflecting direction when the amount of adhered toners is small. As the amount of adhered toners is increased, the quantity of normally reflected light decreases, while the intensity of randomly reflected light increases. Therefore, it seems at first that the thickness of toners of the uniform density image is detected according to the intensity of normally reflected light of the photosensor 102. However, the light detected actually by the photosensor 102 includes both normally reflected light and randomly reflected light. As mentioned above, as the amount of adhered toners is increased, the intensity of normally reflected light decreases but that of randomly reflected light increases. Then, the sum of the two lights changes only a little for the uniform density image as the amount of adhered toners is increased, in contrast to the dot image density. If the photosensor 102 has narrow directivity to detect only the normally reflected light, this contradicts the condition required for the photosensor 102 to detect the area ratio of the standard dot image 91. Then, in this embodiment, the second photosensor 103 is provided to detect the randomly reflected light precisely. Then, the thickness of toners is determined according to the detected value of the randomly reflected light from the standard uniform density image 92. The second photosensor 103 is set at a position near the light emitting diode 101 inside an angle between the light emitting diode 101 and a normal of the photoconductor drum 1 extending from a position at which the light beam from the light emitting diode 101 is incident, in order to detect only the scattered light without affected by the normally reflected light. In other words, the second photosensor 103 is set at the same side as the light emitting diode 101 with respect to the normal of the photoconductor drum 1.

The copying machine uses area gradation method to express gradation. The laser exposure unit 3 performs bi-level exposure on the photoconductor drum 1 according to image data subjected to area gradation processing. The sizes or diameters of dots of the standard dot image 91 are increased or decreased from a reference value according to the humidity or temperature. When the dot size is larger, the area ratio, that is, a ratio of the area of the dots per unit area becomes larger, and the density becomes larger. The density of the standard dot image is also affected by the thickness of toners or the amount of toners adhered on a unit area. If the dot size is kept the same, the density becomes larger for an image having thick toners.

Figure 8:
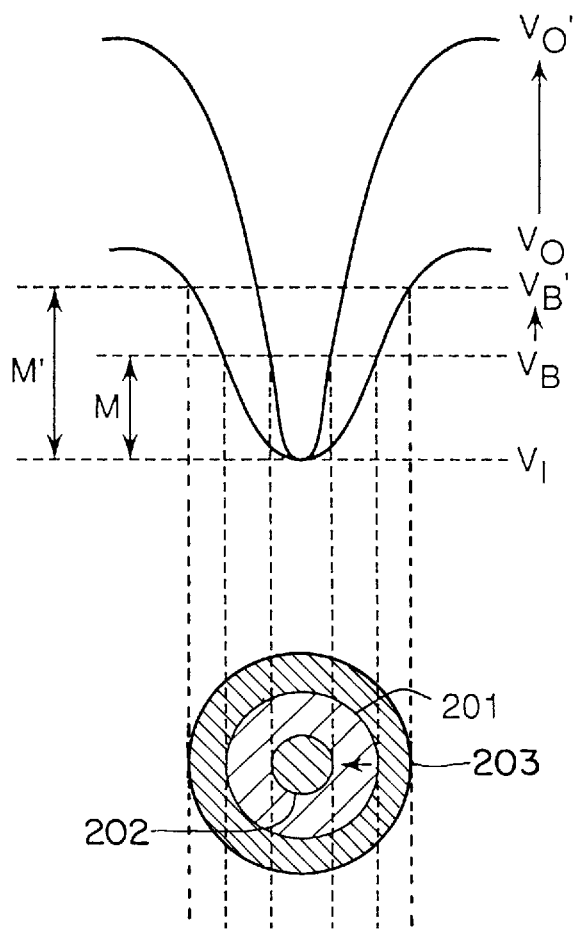
FIG. 8 is a diagram for illustrating a relation between the surface potential $V_o$, development bias voltage $V_B$ and a size of dots formed on the photoconductor drum.

FIG. 8 illustrates a relation between the surface potential $V_O$, the development bias voltage $V_B$ and a size of dots formed by exposing the photoconductor drum 1 with the laser exposure unit 3. The size and thickness of dots are controlled by the surface potential $V_O$ of the photoconductor drum 1 charged by the brush 2 and by the development bias potential $V_B$ applied to the development sleeve 15 by the power source 8. Before exposed by the laser exposure unit 3, a negative surface potential $V_O$ is applied to the photoconductor drum 1, while a negative low bias voltage $V_B$ (satisfying $|V_B|<|V_O|$) is applied to the surface of the development sleeve 15 of the development device 4. As the photoconductor drum 1 is rotated, the surface charged at the surface potential $V_O$ reaches to a position which opposes to the laser exposure unit 3. When it is exposed by the laser exposure unit 3, the surface potential $V_O$ decays to a potential $V_I$. As shown in the upper part in FIG. 8, the intensity of exposure light is adjusted to decay the surface potential to the minimum. The amount of adhered toners increases in proportion to development voltage $\Delta V = |V_B - V_I|$. For example, if the development bias voltage $V_B$ is changed to $V_B'$, the amount of adhered toners is increased from a dot 201 to 203 according as the development voltage is changed from M to M' as shown in the lower part in FIG. 8. As the surface potential $V_O$ increases, the potential gradient becomes steeper, as shown in the upper part in FIG. 8. If the development voltage $\Delta V$ is kept the same, the size of dots formed on the photoconductor drum 1 is changed according to the surface potential $V_O$. As shown in the lower part in FIG. 8, the dot 201 for the surface potential $V_O$ is larger than 202 for the surface potential $V_O'$. Thus, the amount of adhered toners is controlled by the development bias voltage $V_B$ and the dot size is controlled by the surface potential $V_O$. Then, the printer controller 11 detects the area ratio of the standard dot image 91 and the amount of adhered toners of the standard uniform density image 92 with the image sensor 10 and controls the development bias voltage $V_B$ and the surface potential $V_O$ to stabilize an image.

Figure 9:
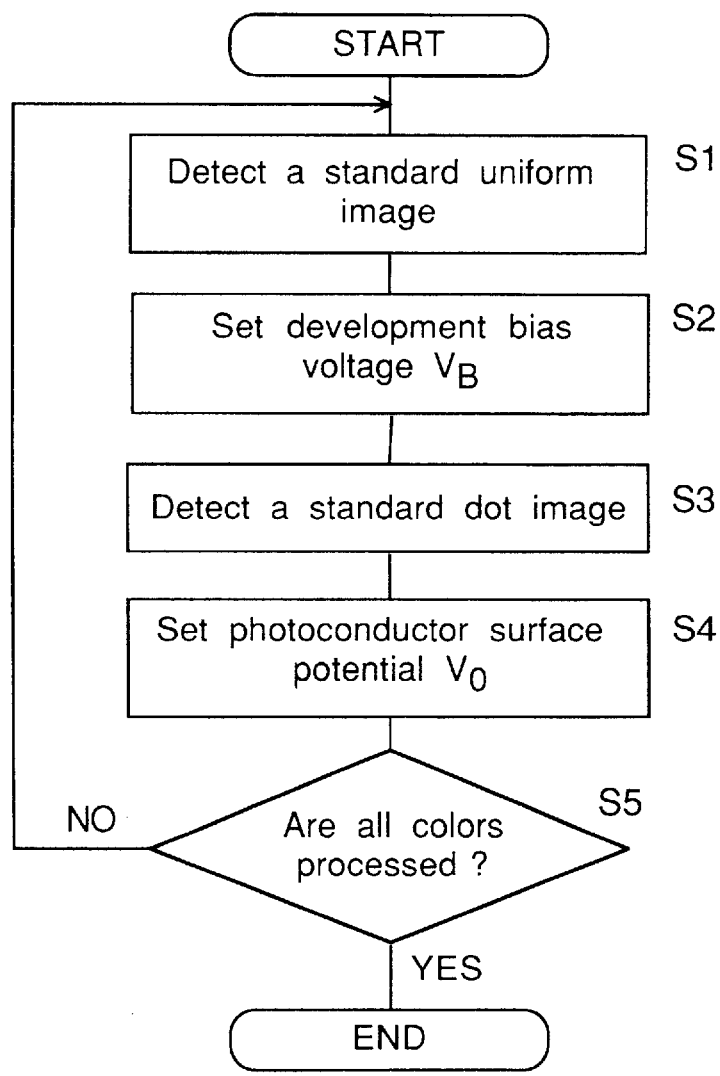
FIG. 9 is a flowchart of the control of image forming conditions of a first embodiment.

As explained above, image forming conditions are controlled before an image according to image data is formed, by detecting the height for a first standard uniform density image and the extension for a second standard dot image. FIG. 9 shows a flowchart of the image density control performed by the printer controller 11. First, a first standard uniform density image 92 is formed in a non-image area on the photoconductor drum 1 with the predetermined development bias voltage $V_B$ and surface potential $V_O$ (step S1). Then, the amount of adhered toners (mg/cm$^2$) is determined according to the intensity of scattered light detected by the photosensor 103 of the image sensor 10, and the development bias voltage $V_B$ is corrected according to Table 1 stored in the memory 16 (step S2).

TABLE 1

Setting values of $V_B$ and $V_O$ determined according to the amount of adhered toners of standard uniform density image

| Amount of adhered toners (mg/cm$_2$) | Setting value of $V_B$ (V) |
|---|---|
| 1.2 | −150 |
| 1.1 | −160 |
| 1.0 | −180 |
| 0.9 | −200 |
| 0.8 | −240 |
| 0.7 | −290 |
| 0.6 | −370 |
| 0.5 | −450 |

On the other hand, after the amount of adhered toner is detected, the standard uniform density image 92 is cleaned by the cleaning unit 6, and a second standard dot image 91 as shown in FIG. 5 is formed in the non-image area by turning on or off the laser exposure device 3 periodically (step S3). Then, the area ratio of the standard dot image is detected with the photosensor 103 based on the intensity of normally reflected light, and the surface potential $V_O$ of the photoconductor drum 1 is corrected according to Table 2 stored in the memory 16 (step S4). In Table 2, the difference in area ratio is represented relative to a standard density. Thus, the initial setting of image forming conditions is completed. Next, an image forming operation for image data is started by using the image forming conditions. Therefore, the image forming can be controlled stably for the same data.

TABLE 2

Adjustment of surface potential $V_O$ for the temporal setting value of surface potential based on the area ratio and the temporal setting value of surface potential

| Difference in area ratio of standard dot image (%) | Adjustment value (V) of surface potential $V_O$ |
|---|---|
| +15 | −180 |
| +10 | −120 |
| +5 | −60 |
| 0 | 0 |
| −5 | +60 |
| −10 | +120 |
| −15 | +180 |
| −20 | +240 |

Next, a second embodiment of the invention is explained. An electrophotographic copying machine of the second embodiment of the invention has the same structure as that of the first embodiment. In order to stabilize gradation characteristic in a dot image, the dot size and the amount of toners adhered to the photoconductor have to be controlled. In this embodiment, a plurality of standard dot images is formed to control the image forming conditions.

Figure 10:
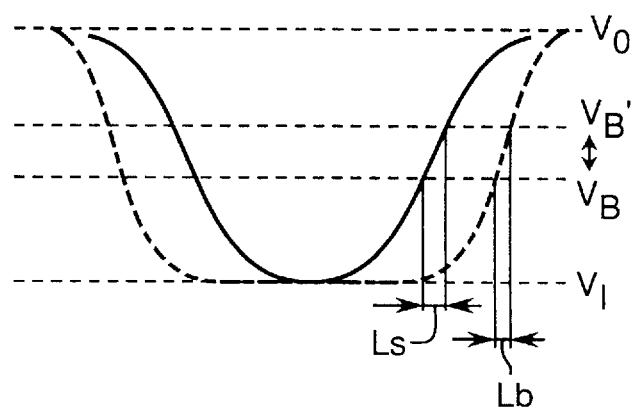
FIG. 10 is a diagram for illustrating an area where the potential decays for a normal intensity of exposure light and for a larger intensity of exposure light.

Next, the control of image forming conditions in this embodiment is explained. FIG. 10 shows a potential distribution on the surface of the photoconductor drum 1 due to exposure with a laser beam. The intensity of laser beam is set at a value to decay the surface potential to the minimum decay potential $V_I$, as shown with a solid line in FIG. 10. If the intensity of exposure is increased further, an area of the minimum decay potential $V_I$ extends in directions to increase the dot size, as shown with a dashed line, or in directions. Thus, dot size, that is, the width of the area having the potential smaller than $V_B$ is expanded.

If the development bias voltage $V_B$ is increased to $V_B'$ as shown in FIG. 10, the amount (thickness) of adhered toners is increased, while the dot size (diameter) is also increased. As shown in FIG. 10, the dot size is increased by $L_s$ for the normal intensity of light beam, while it is increased by $L_b$ less than $L_s$ for the potential distribution for the higher light intensity. This is ascribed to a steeper potential gradient of the surface potential for the higher light intensity.

Figure 11:
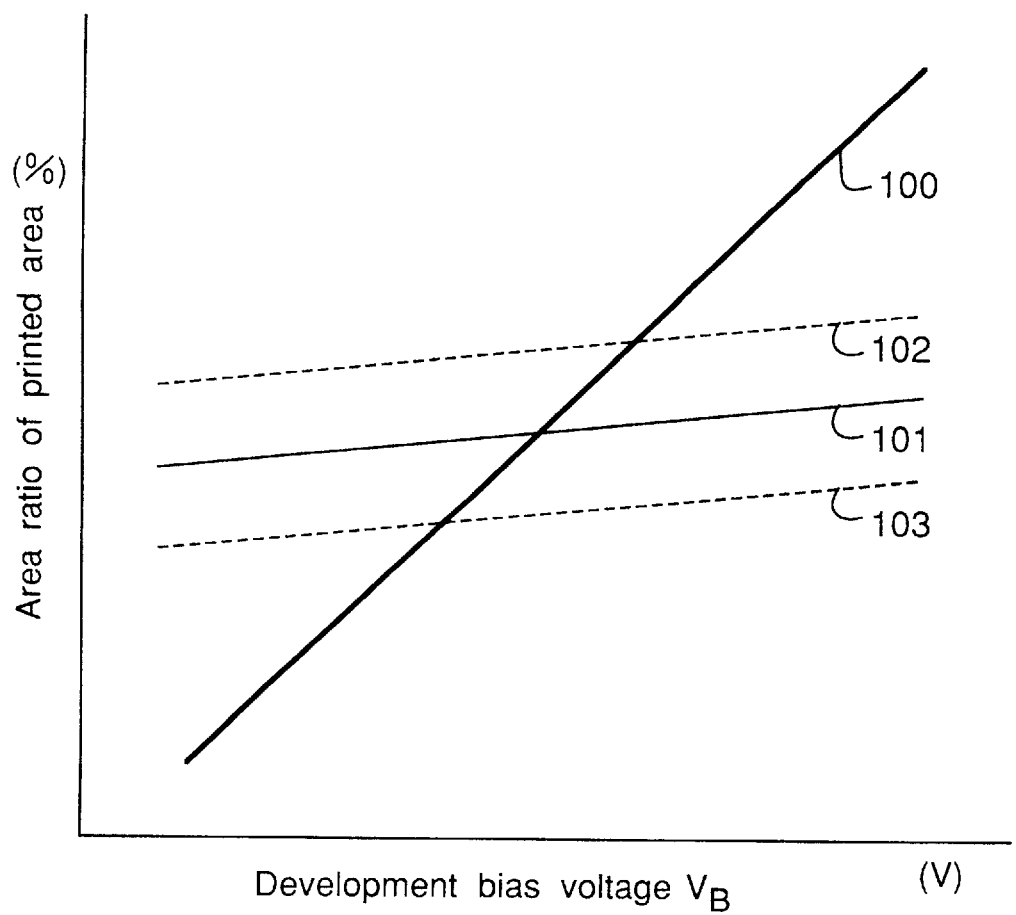
FIG. 11 is a graph of area ratio of printed area for various development bias voltage at the standard surface potential.
Figure 12:
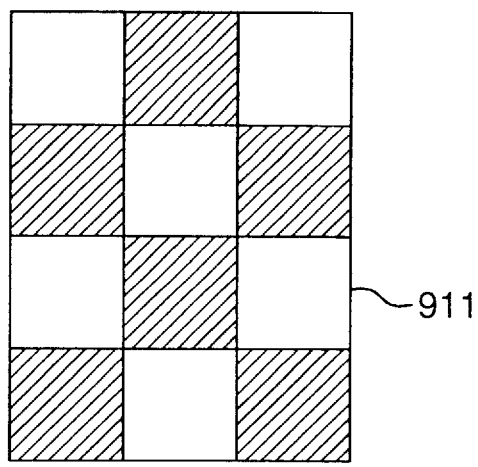
FIG. 12 is a diagram of a comparison dot toner image of area ratio of 50% having larger dots.

FIG. 11 shows a graph of area ratio of printed area (toners) of dot image when the development bias voltage is changed at a constant standard surface potential. A line 100 shows the area ratio plotted against development bias voltage $V_B$ for the standard dot image 91 shown in FIG. 5 of area ratio of 50% formed with the standard surface potential $V_{Oref}$, the standard development bias voltage $V_{Bref}$ and the normal light intensity. On the other hand, a line 101 shows the area ratio for a comparison dot image 911 shown in FIG. 12 of area ratio of 50% having coarser dots formed with the standard surface potential $V_{Oref}$ and the standard development bias voltage $V_{Bref}$, but with a higher light intensity. This shows that the dot size can also be controlled by the intensity of the light beam. It is clear that the change in area ratio caused by changing the development bias voltage $V_B$ is smaller for a dot image having larger dots formed by increasing the light intensity. On the other hand, a dot image having small dots formed with the normal light intensity is unstable for a change in other image forming conditions. Lines 102 and 103 are explained later.

Figure 13:
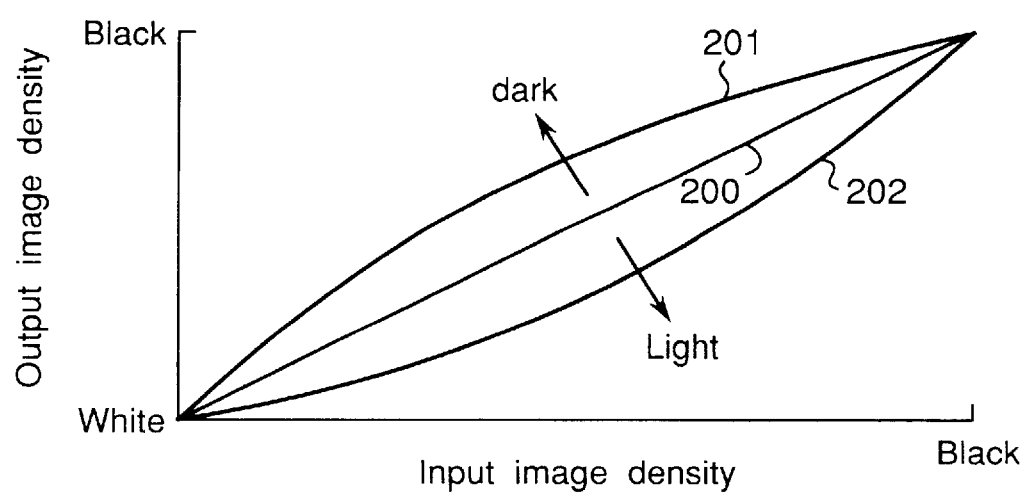
FIG. 13 is a graph of output image density plotted against input image density.

In order to determine image forming conditions, the printer controller 11 first detects the amount of adhered toners of the standard uniform density image 92 and sets the development bias voltage $V_B'$. Then, it detects the area ratios of the standard dot image 91 and the comparison dot image 911 formed by using the development bias voltage $V_B'$ and the standard surface potential $V_{Oref}$, and sets the surface potential $V_O'$ so that the area ratios of the standard dot image 91 and the comparison dot image 911 are the same (50%). FIG. 13 shows a graph of output image density plotted against input image density. By setting the image forming conditions appropriately, the output image density becomes proportional to the input image density, as shown as the relation 200 in FIG. 13. The relations 201 and 202 are explained later.

Figure 14:
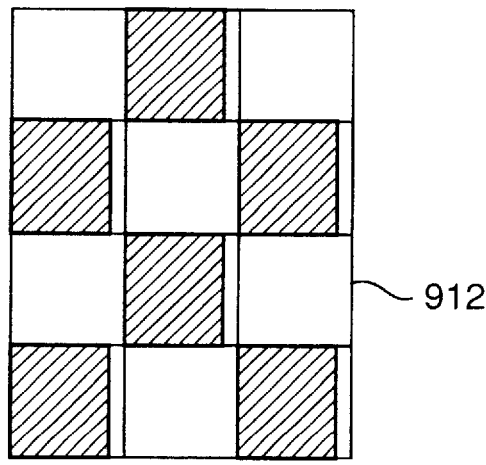
FIG. 14 is a diagram of a comparison dot image of area ratio of 40% having larger dots.
Figure 15:
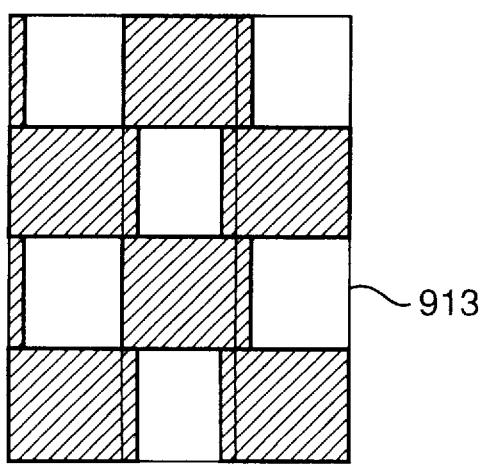
FIG. 15 is a diagram of a comparison dot image of area ratio of 60% having larger dots.

FIGS. 14 and 15 show diagrams of comparison dot images 912 and 913 of area ratio of 40% and 60% having larger dots, illustrated with hatching, formed with a light intensity larger than the normal one. The relations 103 and 102 shown in FIG. 11 correspond to the comparison dot images 912 and 913 of area ratio of 40% and 60%. If the above processing is performed on the comparison dot image 913 of area ratio of 60% instead of the comparison dot image 911 of area ratio of 50% to set the surface potential $V_O'$ so that the area ratios of the comparison dot image 913 and the standard dot image 91 are the same each other, the output image density 201 becomes darker as a whole, as shown in FIG. 13. On the contrary, if the above processing is performed on the comparison dot image 912 of area ratio of 40% instead of the comparison dot image 911 of area ratio of 50% to set the surface potential $V_O'$ so that the area ratios of the comparison dot image 912 and the standard dot image 91 are the same each other, the output image density 202 becomes lighter as a whole, as shown in FIG. 13.

Figure 16:
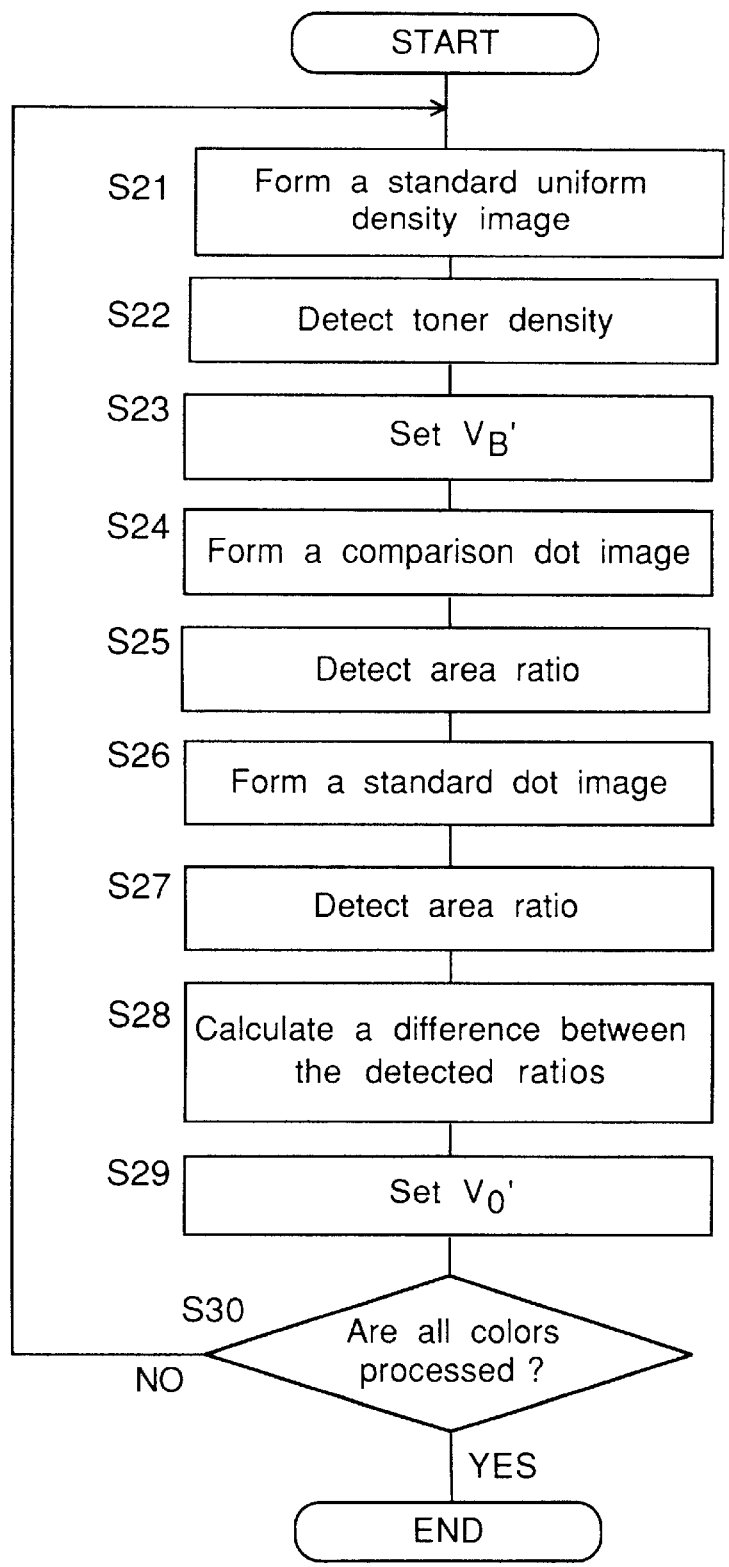
FIG. 16 is a flowchart of the control of image forming conditions of a second embodiment.

FIG. 16 is a flowchart of the control of image forming conditions before forming an image of image data. First, a standard uniform density image 92 is formed in a non-image area on the photoconductor drum 1 by using predetermined development bias voltage $V_{Bref}$ and the surface potential $V_{Oref}$ (step S21). Then, the amount of adhered toners is detected by the image sensor 10 (step S22). Then, by referring to Table 1 stored in the memory 14, the development bias voltage $V_B'$ (refer to FIG. 10) is set to obtain a desired amount of adhered toners (step S23).

Then, a comparison dot image 911, 912 or 913 specified with a key 24, 25 or 26 in the operational panel (FIG. 2) by an operator is formed in the non-image area by using the setting values of $V_B'$ and $V_{Oref}$ (step S24), and the area ratio of the comparison dot image is detected by the image sensor 10 (step S25). When the key 24 is pressed, the comparison dot image 913 (FIG. 13) of area ratio of 60% is formed on the photoconductor drum 1 to darken the image as a whole (refer to FIG. 13). When the key 25 is pressed, the comparison dot image 911 (FIG. 12) of area ratio of 50% is formed to set the standard output image density. When the key 26 is pressed, the comparison dot image 912 (FIG. 14) of area ratio of 40% is formed to lighten the image as a whole (refer to FIG. 13). Next, the standard dot image 91 (FIG. 5) is formed by using the development bias voltage $V_B'$ and the standard surface potential $V_O$ (step S26), and the area ratio of the standard dot image 91 is detected (step S27). Then, a difference between the detected values of the area ratio is calculated (step S28), and the surface potential $V_O'$ which makes the area ratios of the comparison dot image and the standard dot image the same is set according to the difference of the detected area ratios with reference to Table 2 stored in the memory 16 (step S29). If the above-mentioned processing is not completed for each color of cyan, magenta, yellow and black (NO at step S30), the flow returns to step S21. If the above mentioned processing is completed for all the colors (YES at step S30), the control of the image forming conditions is completed.

In the above-mentioned example, the comparison dot images 912 and 913 of area ratios of 40% and 60% are used. However, the area ratio of the comparison dot images is not limited to the above-mentioned examples. For example, the area ratio can be specified with the ten keys 22.

As shown in FIG. 2, three keys 24–26 are provided to set area ratios 60, 50 and 40% of the reference dot images 913, 911, 912. An operator selects the area ratio of the reference dot image by pressing one of the keys 24–26. For example, the key 14 is pressed when the operator wants a darker image. The image forming conditions are controlled by forming the designated comparison dot image 913 and the standard dot image 91. Thus, an output image of desired gradation can be obtained in image forming conditions obtained from a combination of the different area ratios of the designated comparison dot image 913 and the standard dot image 91.

Next, a third embodiment of the invention is explained. An electrophotographic copying machine of the third embodiment of the invention has the same structure as that of the first embodiment. Though image stabilization is explained above, if the sensor output for the processing scatters, the change in extension and height of toners of standard toner images adhered onto the photoconductor cannot be detected sufficiently precisely in order to control the image forming conditions. In this embodiment, the accuracy of the sensor is increased by changing relative speed of the photoconductor to the development sleeve.

Figure 17:
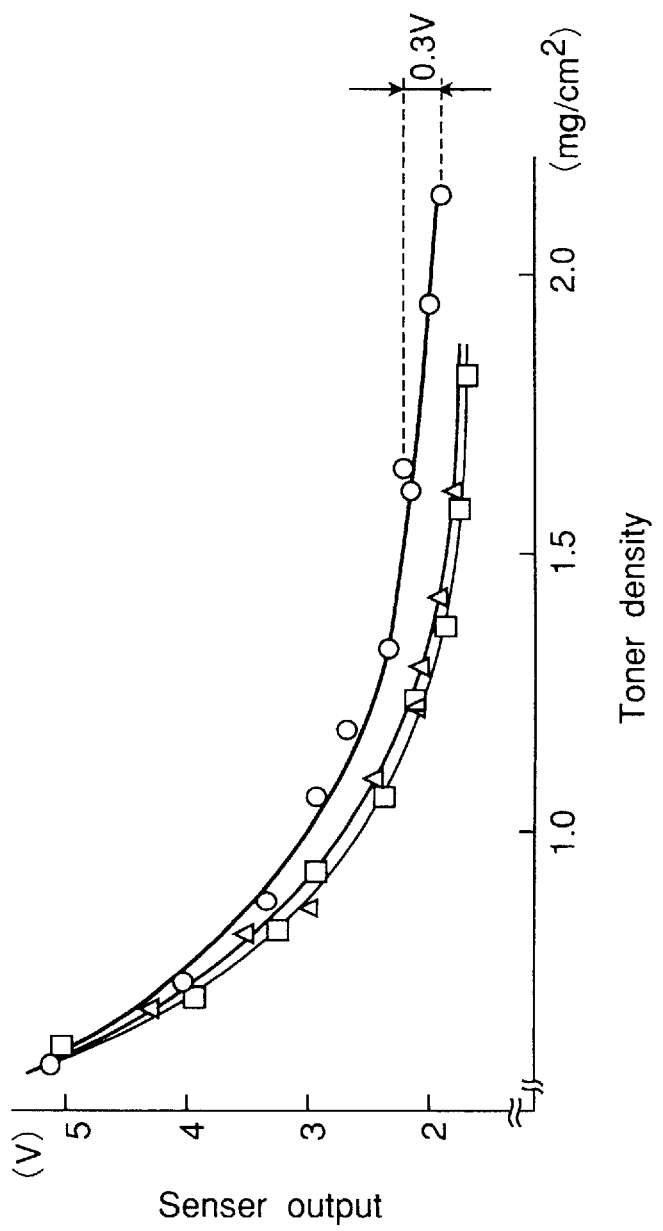
FIG. 17 is a graph on an output of a photosensor plotted against the density (mg/cm$^2$) of a toner image formed on a photoconductor drum.

FIG. 17 shows an output of the photosensor 10 plotted against the toner density (mg/cm$^2$) of a toner image formed on the photoconductor drum 1. The points denoted with open circle represent outputs for cyan toners, those denoted with open triangle represent outputs for magenta toners, and those denoted with open square represents outputs for yellow toners. As the toner density increases, the reflectance of the light beam of the light emitting diode 13 from the photoconductor is decreased, and it saturates at toner density above 2.0 mg/cm$^2$. As shown in FIG. 17, as the reflectance saturates, the output of the photosensor 10 becomes constant. (The constant value is referred to as saturation value.) In order to control the image density with high precision, it is needed to control the intensity of the light beam so that the output (saturation value) of the photosensor 10 for a high uniform density image always has a specified value. Then, the printer controller 11 forms a high uniform density toner image of the amount of adhered toners of about 2 mg/cm$^2$ on the photoconductor drum 1 and controls the intensity of the light beam so that the output of the photosensor 10 has the specified value.

Figure 18:
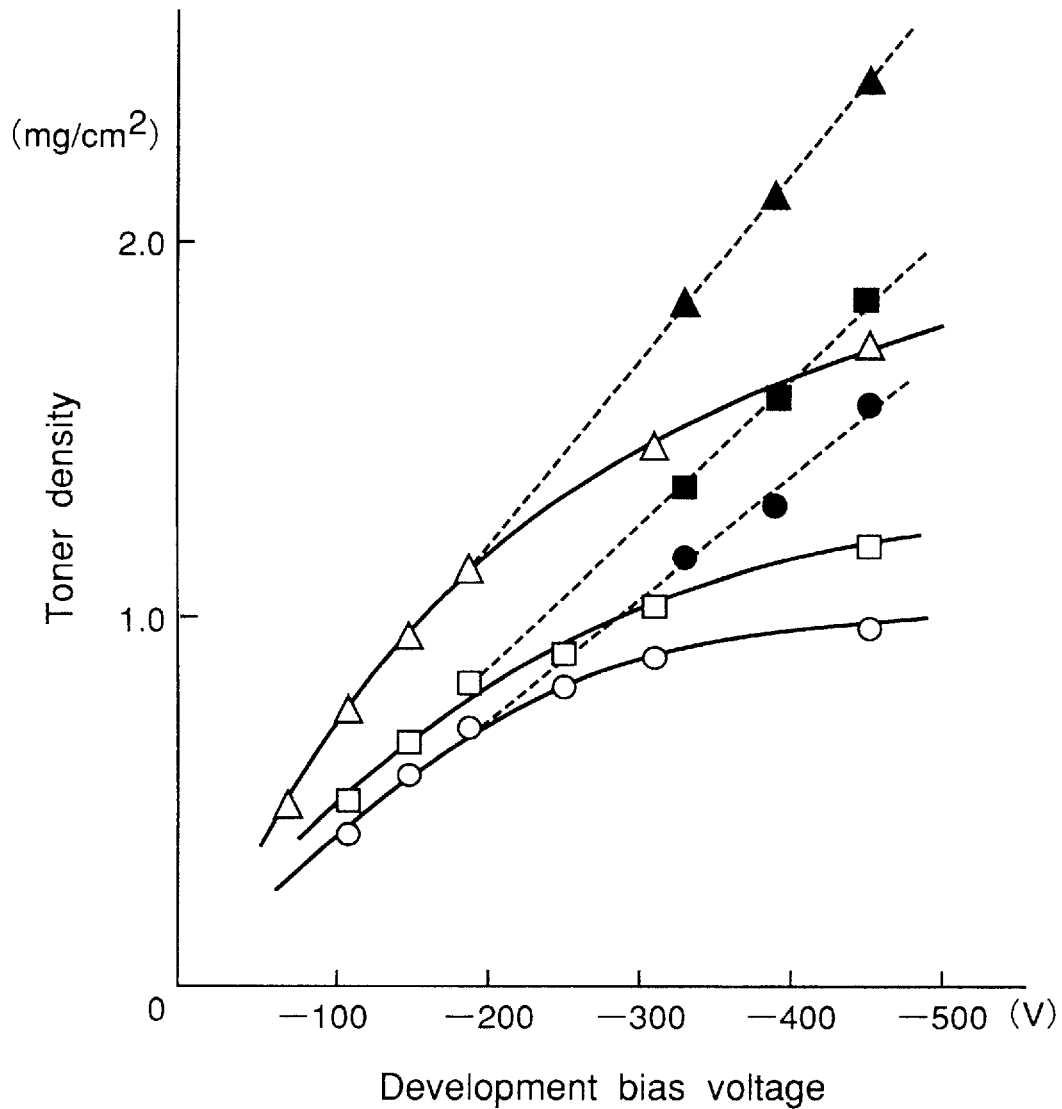
FIG. 18 is a graph of toner density of a toner image formed on the photoconductor drum plotted against development bias voltage $V_B$.

FIG. 18 shows toner density of a toner image formed on the photoconductor drum 1 plotted against development bias voltage $V_B$. Solid lines represent toner densities when the photoconductor drum 1 and the development sleeve 14 are rotated at the same speed as that on forming an image according to image data. A solid line with points of open circle represent toner density for cyan toners, that with points of open triangle represent toner density for magenta toners, and that with points of open square represents toner density for yellow toners. The toner density does not increase linearly with the development bias voltage $V_B$ because the amount of toners carried by the development sleeve 14 has a limit.

For example, if toners adhered to the surface of the development sleeve 14 is 0.5 mg/cm$^2$ at the maximum and the development sleeve 14 is rotated twice as the photoconductor drum 1 is rotated once, the maximum amount of adhered toners increased to 1.0 mg/cm$^2$ at the maximum. This phenomenon occurs more apparently for a one-component development material than for two-component development material comprising toners and carriers.

Then, when an image of high and uniform density is formed, the printer controller 11 decreases the rotation speed of the photoconductor drum 1 to a third of the normal speed. Then, toners as many as three times that of the normal case can be supplied onto the photoconductor drum 1. The dashed lines in FIG. 18 show toner densities when the photoconductor drum 1 is rotated at the speed of a third of the normal speed. A dashed line with points of solid circle represent toner density for cyan toners, that with points of solid triangle represent toner density for magenta toners, and that with points of solid square represents toner density for yellow toners. Because the rotation speed of the photoconductor drum 1 is reduced to a third, the maximum amount to be supplied to the photoconductor drum 1 is sufficiently large and the toners can be adhered in proportion to the development bias voltage $V_B$.

Though the rotation speed of the photoconductor drum 1 is decreased in this example, the rotation speed of the development sleeve 14 may be increased to three times the normal rotation speed of the photoconductor. That is, at least one of the photoconductor drum 1 and the development sleeve 14 is controlled so that the number of rotation of the development sleeve 14 per rotation of the photoconductor drum 1 is increased larger than the normal value on forming an image according to image data.

Figure 19:
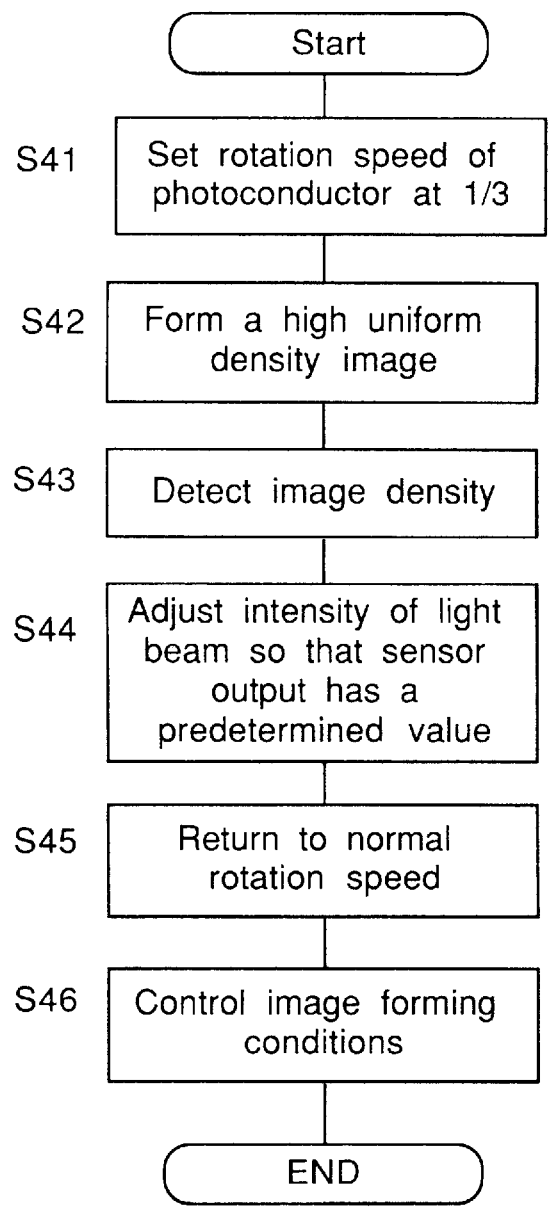
FIG. 19 is a flowchart on the control of image forming conditions.

FIG. 19 shows a flowchart on the control of image forming conditions performed before actual image forming processing is performed. First, the rotation speed of the photoconductor drum 1 is set at a third of the normal value (step S41). Then, the development bias voltage $V_B$ is set at −350 V to form a high uniform density image of toner density of 2 mg/cm² is formed in the non-image area of the photoconductor drum 1 (step S42). Then, the light emitting diode 13 emits a light beam of a default intensity to illuminate the image, and the intensity of the light reflected from the high density image is detected by the photosensor 10 (step S43). Next, the light intensity of the light emitting diode 13 is adjusted so that the detected value of the photosensor 10 has a predetermined value (for example 2.0 V) (step S44), and the rotation speed of the photoconductor drum 1 is reset at the normal value (step S45). Thus, the light intensity of the light emitting diode 13 is set appropriately, and the image forming conditions are set precisely according to the detected value of the photosensor 10. Then, the intensity of the light reflected from the standard toner image is detected by the photosensor 10, and the image forming conditions such as the surface potential $V_O$ and the development bias voltage $V_B$ are adjusted (step S46).

Although the present invention has been fully described in connection with the preferred embodiments thereof with reference to the accompanying drawings, it is to be noted that various changes and modifications are apparent to those skilled In the art. Such changes and modifications are to be understood as included within the scope of the present invention as defined by the appended claims unless they depart therefrom.

What is claimed is:

1. An image forming apparatus forming an image according to image data, the apparatus comprising:

a means for forming a first standard toner image and a second standard toner image on an image supporting member, the first standard toner image having toners of a uniform density, the second standard toner image having a plurality of dots made of toners with predetermined spaces between them;

a light source illuminating the first and second standard toner images formed by said forming means;

a first detector detecting a light scattered from the first standard toner image illuminated by said light source;

a second detector detecting a light normally reflected from the second standard toner image illuminated by said light source; and a controller controlling image forming conditions for forming an image according to image data according to the lights detected by said first and second detectors.

2. The apparatus according to claim 1, wherein said first detector is set at a position as the same side as said light source with respect to a normal of the first standard image extending from a position at which a light beam emitted by said light source is incident.

3. The apparatus according to claim 1, wherein said second detector is set at a position as the opposite side to said light source with respect to a normal of the first standard image extending from a position at which a light beam emitted by said light source is incident.

4. The apparatus according to claim 1, wherein said forming Weans forms the second standard image by turning on or off the light emission of said light source at predetermined periods.

5. An image forming apparatus, wherein a photoconductor sensitized at a predetermined surface potential is exposed by an exposure device to form an electrostatic latent image and the latent image is developed to form a toner image by applying a development bias voltage, the apparatus comprising:

a light source illuminating an image formed on said photoconductor;

a first means for forming a first standard toner image on said photoconductor before forming a toner image according to image data, the first standard toner image having toners of a uniform density;

a first detector detecting a light scattered from the first standard toner image illuminated by said light source;

a bias correction means for correcting the development bias voltage according to the light detected by said first detector;

a second means for forming a second standard toner image on said photoconductor with the development bias voltage corrected by said bias correction means after removing the first standard image, the second standard toner image having a plurality of dots made of toners with predetermined spaces between them;

a second detector detecting a light normally reflected from the second standard toner image illuminated by said light source; and a controller controlling a surface potential of said photoconductor for forming an image according to image data according to the light detected by said second detector.

6. The apparatus according to claim 5, wherein said first detector is set at a position as the same side as said light source with respect to a normal of the first standard image extending from a position at which a light beam emitted by said light source is incident.

7. The apparatus according to claim 5, wherein said second detector is set at a position as the opposite side to said light source with respect to a normal of the first standard image extending from a position at which a light beam emitted by said light source is incident.

8. The apparatus according to claim 5, wherein said forming means forms the second standard image by turning on or off the light emission of said light source at predetermined periods.

9. A method for controlling image forming conditions in an image forming apparatus wherein a photoconductor sensitized at a predetermined surface potential by a charger is exposed by an exposure device to form an electrostatic latent image and the latent image is developed to form a toner image by applying a development bias voltage, the method comprising the steps of:

forming a first standard toner image on the photoconductor before forming a toner image according to image data, the first standard toner image having toners of a uniform density;

detecting a light scattered from the first standard toner image illuminated by a light source;

forming a second standard toner image on the photoconductor, the second standard toner image having a plurality of dots made of toners with predetermined spaces between them;

detecting a light normally reflected from the second standard toner image illuminated by the light source; and controlling image forming conditions according to the detected lights from the first and second standard toner images for forming an image according to image data.

10. A method for controlling image forming conditions in an image forming apparatus wherein a photoconductor sensitized at a predetermined surface potential by a charger is exposed by an exposure device to form an electrostatic latent image and the latent image is developed to form a toner image by applying a development bias voltage, the method comprising the steps of:

forming a first standard toner image on the photoconductor before forming a toner image according to image data, the first standard toner image having toners of a uniform density;

detecting a light scattered from the first standard toner image illuminated by a light source;

correcting the development bias voltage according to the detected light scattered from the first standard toner image;

forming a second standard toner image on the photoconductor with the corrected development bias voltage after removing the first standard image, the second standard toner image having a plurality of dots made of toners with predetermined spaces between them;

detecting a light normally reflected from the second standard toner image illuminated by said light source; and controlling a surface potential of the photoconductor according to the normally reflected light detected.

11. An image forming apparatus forming an image according to image data, the apparatus comprising:

a photoconductor;

a charger for charging said photoconductor uniformly;

a light source exposing said photoconductor with a light beam;

a means for forming a first standard toner image on said photoconductor with a predetermined light intensity by turning the light source on and off before forming an image according to image data, the first standard toner image having a plurality of dots each made of toners;

a first detector detecting a ratio of dot areas per unit area of the first standard toner image;

a means for forming a second standard toner image on said photoconductor with a light intensity different from the predetermined light intensity by turning said light source on and off, the second standard toner image having a plurality of dots each made of toners;

a second detector detecting a ratio of dots per unit area of the second standard toner image;

a comparator comparing the ratios detected by said first and second detectors; and a controller controlling image forming conditions for forming an image according to image data so that the ratios detected by said first and second detectors are the same each other.

12. An image forming apparatus forming an image according to image data, the apparatus comprising:

a charger for charging a photoconductor uniformly;

a light source exposing the photoconductor with a light beam;

a means for forming a first standard toner image on the photoconductor with a predetermined light intensity by turning the light source on and off before forming an image according to image data, the first standard toner image having a plurality of dots each made of toners;

a first detector detecting a ratio of dots per unit area of the first standard toner image;

a means for selectively forming one of a plurality of second standard toner images on the photoconductor with a light intensity different from the predetermined light intensity by turning the light source on and off before forming an image according to image data, the second standard toner images having a plurality of dots each made of toners and having different ratios of dot area per unit area from each other;

a second detector detecting a ratio of dots per unit area of the selected second standard toner image;

a comparator comparing the ratios detected by said first and second detectors; and a controller controlling image forming conditions for forming an image according to image data so that the ratios detected by said first and second detectors are the same each other.

13. The image forming apparatus according to claim 12, wherein the light intensity for forming the second standard toner images is higher than that for forming the first standard toner image.

14. The image forming apparatus according to claim 13, wherein the dot size of the first standard toner image is smaller than that of the second standard toner image.

15. The image forming apparatus according to claim 12, further comprising a selector which selects said one of said plurality of second standard toner images.

16. The image forming apparatus according to claim 15, wherein said selector comprises an operational panel.

17. The image forming apparatus according to claim 12, wherein the image forming conditions controlled by said controller comprises the surface potential of the photoconductor.

18. A method for controlling image forming conditions in an image forming apparatus wherein a photoconductor sensitized at a predetermined surface potential is exposed with a light beam to form an electrostatic latent image and the latent image is developed to form a toner image by applying a development bias voltage, the method comprising the steps of:

forming a first standard toner image on the photoconductor with a predetermined light intensity by turning a light source on and off, the first standard toner image having a plurality of dots each made of toners;

detecting a ratio of dots per unit area of the first standard toner image;

forming a second standard toner image on the photoconductor with a light intensity different from the predetermined light intensity by turning the light source on and off before forming a toner image according to image data, the second standard toner image having a plurality of dots each made of toners;

detecting a ratio of dot areas per unit area of the second standard toner image;

comparing the ratios detected for the first and second standard toner images; and controlling image forming conditions for forming an image according to image data so that the ratios detected for the first and second standard toner images are the same each other.

19. A method for controlling image forming conditions in an image forming apparatus wherein a photoconductor sensitized at a predetermined surface potential is exposed with a light beam to form an electrostatic latent image and the latent image is developed to form a toner image by applying a development bias voltage, the method comprising the steps of:

forming a first standard toner image on the photoconductor with a predetermined light intensity by turning a light source on and off, the first standard toner image having a plurality of dots each made of toners;

detecting a ratio of dot areas per unit area of the first standard toner image;

selectively forming one of a plurality of second standard toner images on the photoconductor with a light intensity different from the predetermined light intensity by turning the light source on and off, the second standard toner images having a plurality of dots each made of toners and having different ratios of dot area to unit area from each other;

detecting a ratio of dot areas per unit area of the selected second standard toner image;

comparing the ratios detected for the first and selected second standard toner images; and controlling image forming conditions for forming an image according to image data so that the ratios detected for the first and selected second standard toner images are the same each other.

20. An image forming apparatus forming an image according to image data, the apparatus comprising:

a photoconductor;

a means for forming a standard toner image;

a means for forming a first toner image on said photoconductor developed with a development device by means of delaying a relative speed of said photoconductor to said development device, wherein the first toner image has a density larger than the standard toner image;

a light source illuminating the first toner image;

a detector detecting a light reflected from the first toner image illuminated by said light source; and a controller adjusting a light intensity of said light source so that an intensity of the light reflected from the first toner image has a predetermined value.

21. The image forming apparatus according to claim 20 wherein said delay of the relative speed is performed by decreasing a rotation speed of said photoconductor.

22. The image forming apparatus according to claim 20 wherein said delay of the relative speed is performed by increasing a rotation speed of said development device.

23. A method for controlling image forming conditions in an image forming apparatus, the method comprising the steps of:

forming a standard toner image;

forming a first toner image on a photoconductor developed with a development device by means of delaying a relative speed of said photoconductor to said development device, wherein the first toner image has a density larger than the standard toner image;

detecting an intensity of a light reflected from the first toner image; and adjusting a light intensity of a light source so that the intensity of the light reflected from the first toner image has a predetermined value.

24. An image forming apparatus forming an image according to image data, the apparatus comprising:

an image supporting member;

a development device forming a toner image on the image supporting member;

a controller controlling an image forming condition according to a density of a standard toner image which is formed on the image supporting member before an image forming action based on an image information;

a delay means for delaying a relative speed of said image supporting member to said development device so as to form a first toner image before forming the standard toner image, said first toner image having a density larger than the standard toner image;

a sensor detecting a density of the first toner image; and an adjusting means for adjusting a sensitivity of the sensor based on the first toner image.

25. The image forming apparatus according to claim 24, wherein said sensor comprises a photo-sensor which detects the density based on an intensity of reflected light from the toner image illuminated by a light source, and said adjusting means adjusts a light intensity of the light source so that an intensity of reflected light from the first toner image has a predetermined value.

26. A method for controlling image forming conditions in an image forming apparatus, the method comprising the steps of:

forming a standard toner image;

forming a first toner image on an image supporting member by delaying a relative speed of said image supporting member to a development device, the first toner image having a density larger than the standard toner image;

detecting the density of the first toner image by a sensor; and adjusting sensitivity of the sensor based on the first toner image.

* * * * *

UNITED STATES PATENT AND TRADEMARK OFFICE
CERTIFICATE OF CORRECTION

PATENT NO. : 5,873,011
DATED : February 16, 1999
INVENTOR(S) : Takemoto, et. al.

It is certified that error appears in the above-identified patent and that said Letters Patent is hereby corrected as shown below:

Claim 4, line 11, delete "Weans" and insert --means--.

Signed and Sealed this

Seventh Day of March, 2000

Attest:

Attesting Officer

Q. TODD DICKINSON

Commissioner of Patents and Trademarks

UNITED STATES PATENT AND TRADEMARK OFFICE
CERTIFICATE OF CORRECTION

PATENT NO.    : 5,873,011
DATED         : February 16, 1999
INVENTOR(S)   : Takemoto et al.

It is certified that error appears in the above-identified patent and that said Letters Patent is hereby corrected as shown below:

Column 11,
Line 58, delete "Weans" and insert -- means --.

This certificate supersedes Certificate of Correction issued March 7, 2000.

Signed and Sealed this

Tenth Day of December, 2002

JAMES E. ROGAN
*Director of the United States Patent and Trademark Office*